United States Patent [19]

Kempken

[11] Patent Number: 4,748,357

[45] Date of Patent: May 31, 1988

[54] ELECTROMECHANICAL APPARATUS FOR PRODUCING AN AXIAL FORCE FOR ACTUATING CLAMPING DEVICES

[75] Inventor: Rainer Kempken, Erkrath, Fed. Rep. of Germany

[73] Assignee: Paul Forkardt GmbH & Co. KG, Düsseldorf, Fed. Rep. of Germany

[21] Appl. No.: 90,168

[22] Filed: Aug. 27, 1987

[30] Foreign Application Priority Data

Aug. 29, 1986 [DE] Fed. Rep. of Germany ....... 3629453

[51] Int. Cl.⁴ .......................... H02K 7/06; B23B 31/28
[52] U.S. Cl. ..................................... 310/80; 74/89.15; 409/233
[58] Field of Search .................. 74/89.15; 279/1 H; 310/80, 83; 408/1 R; 409/231, 233

[56] References Cited

U.S. PATENT DOCUMENTS

| | | | |
|---|---|---|---|
| 2,909,965 | 10/1959 | Vlieg | 409/233 |
| 3,220,313 | 11/1965 | Schroeder | 409/233 |
| 3,575,434 | 4/1971 | Kiwalle | 279/1 H |
| 4,413,938 | 11/1983 | Kuczenski | 409/233 |
| 4,604,008 | 8/1986 | Bone | 409/231 |

FOREIGN PATENT DOCUMENTS

| | | | |
|---|---|---|---|
| 3101301 | 1/1982 | Fed. Rep. of Germany . | |
| 3400439 | 7/1984 | Fed. Rep. of Germany | 279/1 H |
| 850318 | 7/1984 | U.S.S.R. | 279/1 H |

Primary Examiner—Patrick R. Salce
Assistant Examiner—D. L. Rebsch
Attorney, Agent, or Firm—Becker & Becker, Inc.

[57] ABSTRACT

An electromechanical apparatus for producing an axial force for the actuation of a clamping device, such as a chuck that rotates with the arbor of a machining tool. The apparatus includes an electric motor that has a stator and a rotor, with the relative movement between the rotor and stator being transferable, via a gear system and a shaft drive as an axial movement, to a tie rod which is preferably hollow. In order to have a small overall size, and to reduce the frictional forces that occur during actuation, the rotor is connected with a gear wheel in which meshes at least one pinion that is secured to a shaft that is mounted in a housing in such a way that it cannot shift axially. Disposed on the shaft is a nut that in turn is connected to the tie rod, which is axially movably mounted in the housing.

6 Claims, 3 Drawing Sheets

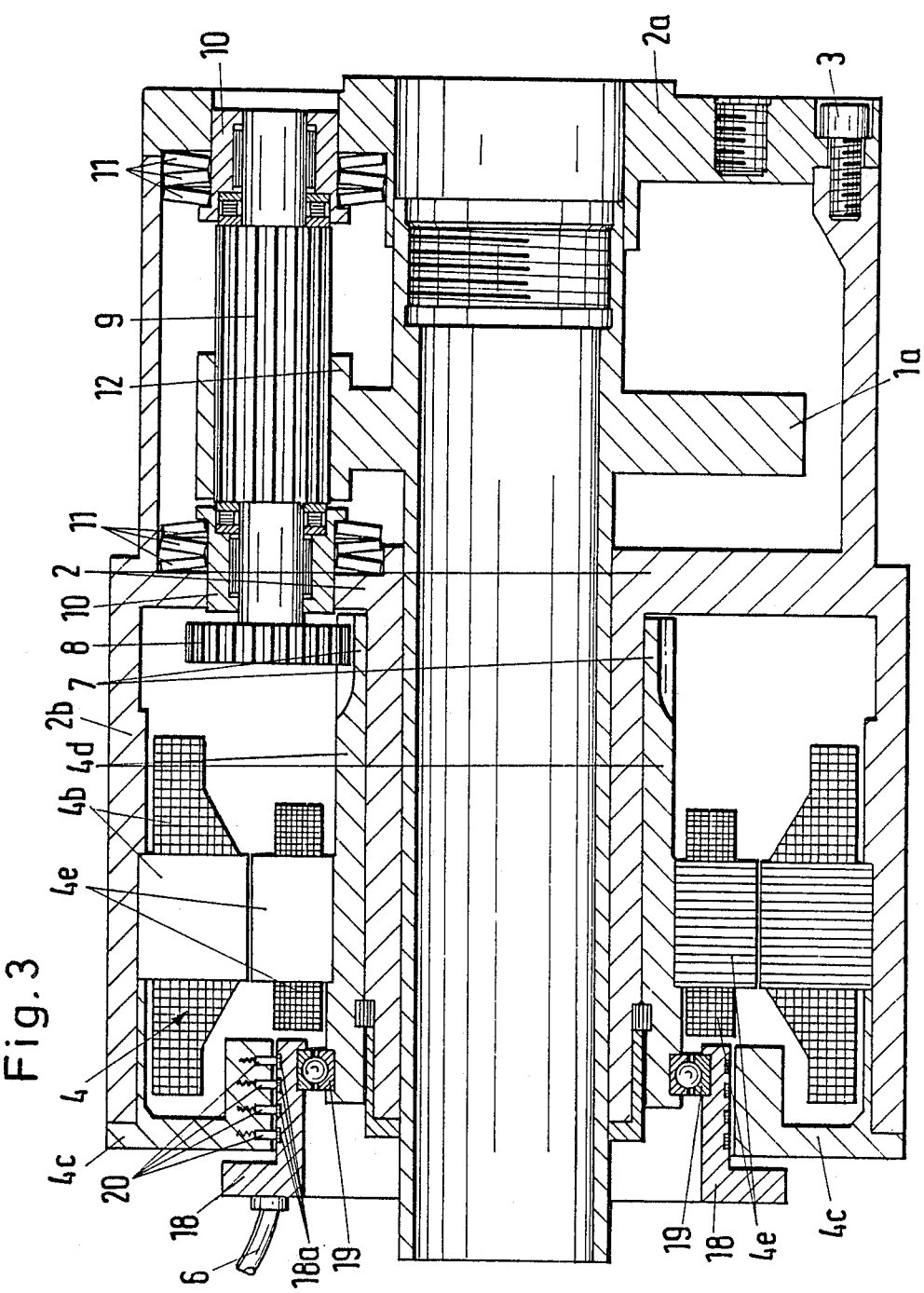

ELECTROMECHANICAL APPARATUS FOR PRODUCING AN AXIAL FORCE FOR ACTUATING CLAMPING DEVICES

BACKGROUND OF THE INVENTION

The present invention relates to an electromechanical apparatus for producing an axial force for the actuation of a clamping device, preferably of a chuck that rotates with the spindle or arbor for a machining tool. The apparatus includes an electric motor that has a stator and a rotor, with the relative movement between the rotor and the stator being transferable, via a gear system and a shaft drive, as an axial movement, to a tie rod, which is preferably hollow.

Apparatus of the aforementioned general type, especially for actuating chucks that rotate with the arbor of a machining tool, are known. With the apparatus disclosed in German Offenlegungsschrift No. 31 01 301, a central shaft is used that is connected to the tie rod. Especially in view of the hollow configuration of the tie rod, this shaft has to have a large thread diameter and hence large thread dimensions, so that not only do heavy structures result, but in addition, due to the high frictional forces, a particularly large electric motor must also be used. Furthermore, a complicated process for the production of the movement results, since the gears that are connected to the rotor of the electric motor in a planetary fashion have different numbers of teeth because these gears on the one hand ride in a fixed gear ring, and on the other hand ride in a rotatably mounted double gear that in turn is provided with the toothing that acts as the nut.

Starting from an apparatus of the aforementioned general type, it is an object of the present invention to reduce not only the space required but also the weight, and at the same time, to reduce the frictional losses, to simplify the construction so that the inventive electromechanical apparatus can also be used with today's turning machines, that customarily operate at high speeds and with high clamping forces.

BRIEF DESCRIPTION OF THE DRAWINGS

These and other objects and advantages of the present invention will appear more clearly from the following specification in conjunction with the accompanying schematic drawings, in which:

FIG. 3 is a longitudinal cross-sectional view through a second exemplary embodiment of the inventive apparatus.

SUMMARY OF THE INVENTION

The apparatus of the present invention is characterized primarily in that the rotor is connected to a gear wheel in which meshes at least one pinion that is secured to a shaft that is mounted in a housing in such a way that it cannot shift axially, with a nut being disposed on this shaft, this nut in turn being connected to the tie rod, which is axially movably mounted in the housing.

The inventive proposal provides the advantage that by using one or more threaded shafts that surround the tie rod in a planetary manner, small thread diameters result, a lightweight electric motor can be used, and yet high axial forces are produced. A hollow tie rod can be retained that is suitable for supplying workpieces to the clamping device.

Pursuant to a further feature of the present invention, to reduce the frictional forces, roller bodies can be disposed between the sides of the threads of the shaft and the nut, and a controllable arresting means can be disposed between the shaft and the bearing housings thereof; where needed, this arresting means replaces the self-locking configuration that is eliminated by the use of roller bodies. Pursuant to one preferred embodiment, the arresting means can be disengaged, counter to the force of at least one spring, by an electromagnet.

In order to achieve a post-clamping effect when the prescribed clamping position has been reached, the shaft can inventively be shifted via the pinion relative to the bearing housing or the gear wheel by a given travel stroke of a spring-loaded element that is disposed between the shaft and the bearing housing. This spring-loaded element is loaded in conformity to the applied clamping force and the clamping device, and results in an appropriate slight shifting of the shaft.

Pursuant to a further refinement of the inventive concept, it is proposed to detect the axial shifting of the shaft with a sensor to determine the stored force, so that the axial force produced at any given time is not only monitored, but can also be precisely controlled within the framework of the program of the machining tool.

If the inventive apparatus is used to actuate chucks that rotate with the arbor of a machining tool, the stator of the electric motor can either be stationary or can rotate with the housing. In the last mentioned situation, it is finally proposed pursuant to the present invention to dispose the stator of the electric motor in a housing that is connected to the bearing housing of the shaft and rotates therewith, with electrical energy for the stator being supplied via a slip ring arrangement.

Further specific features of the present invention will be disclosed in detail subsequently.

DESCRIPTION OF PREFERRED EMBODIMENTS

Figure 1:
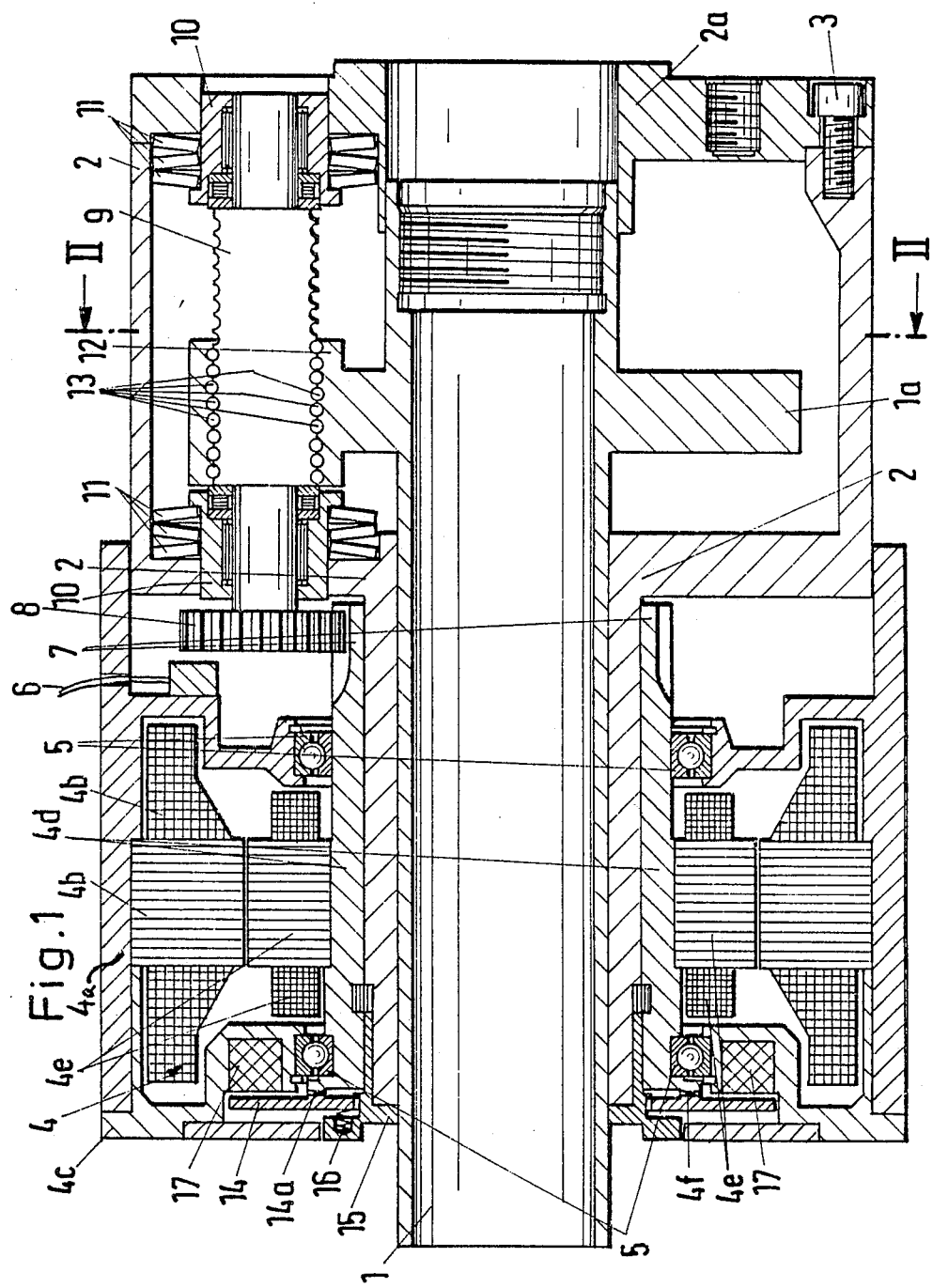
FIG. 1 is a longitudinal cross-sectional view through a first exemplary embodiment of the inventive apparatus.
Figure 2:
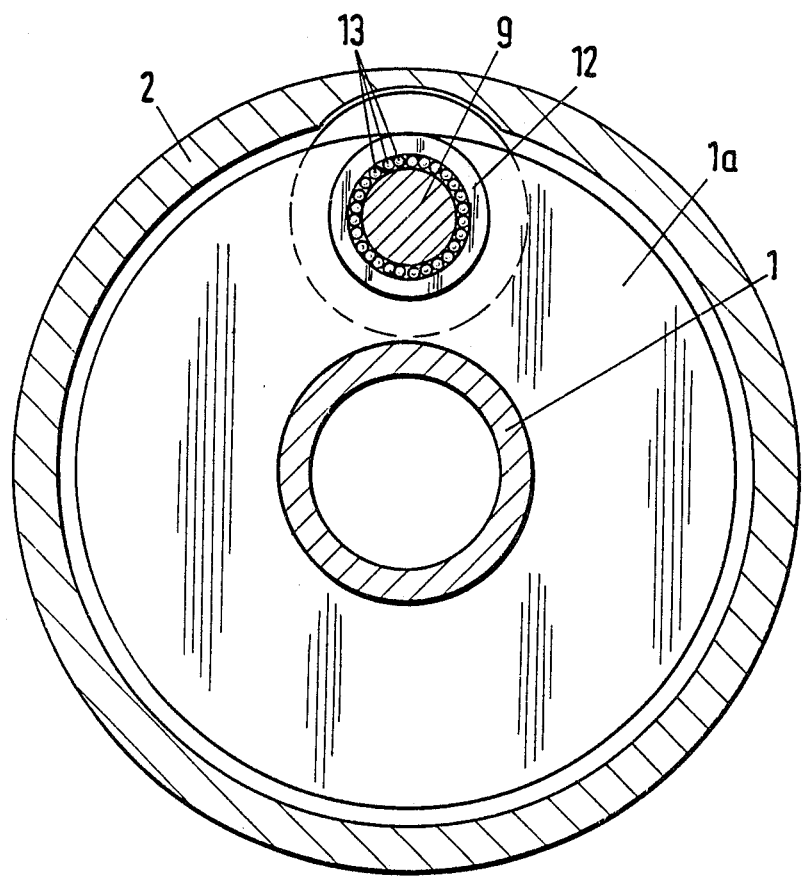
FIG. 2 is a cross-sectional view taken along the line II—II in FIG. 1.

Referring now to the drawings in detail, the two embodiments illustrated in FIGS. 1 to 3 serve to produce an axial force for actuating a chuck that rotates along with the spindle or arbor of a machining tool, and that is provided with a central bore for the workpieces that are to be supplied. The drive element of this not-illustrated chuck is connected to a hollow tie rod 1 that is axially movably mounted in a housing 2. The latter is closed off by a cover 2a that is secured by several screws 3 and thus belongs to the housing 2.

The axial movement of the tie rod 1 relative to the housing 2 is produced by an electric motor 4, the stator 4b of which is disposed in a motor housing 4a and is stationary even when the arbor, and hence the tie rod 1, rotate. For this purpose, the motor housing 4a, as well as a pertaining motor cover 4c, are mounted on a motor shaft 4d via ball bearings 5; the rotor 4e of the electric motor 4 is disposed on the motor shaft 4d. As shown in FIG. 1, the connections or leads 6 for the stator 4b lead out of the fixed motor housing 4a.

The output end of the motor shaft 4d, which carries the rotor 4e of the electric motor 4, is embodied as a gear wheel 7 with which, in both embodiments, a pinion 8 meshes. If greater chucking forces are to be transmitted, several such pinions 8 could be uniformly distributed about the periphery.

The pinion 8 is secured to a shaft 9 that is mounted in a housing 2 or housing cover 2a in such a way that it essentially cannot be shifted axially. In both embodiments, the ends of this shaft 9 are each mounted in a bearing housing 10 via a radial needle bearing and an axial ball bearing. Each bearing housing 10 can be displaced slightly relative to the housing 2 or the housing cover 2a in conformity to the travel stroke of a spring-loaded element 11. The correspondingly limited relative movement between the pinion 8 and the gear wheel 7 is possible via a suitable configuration of the teeth thereof. In both embodiments each of the spring-loaded elements 11 comprises three plate springs.

A nut 12 is disposed on the shaft 9. In the first embodiment, roller bodies 13 are disposed between the sides of the threads of the shaft 9 and the nut 12. With the embodiment illustrated in FIG. 1, these roller bodies 13, which are in the form of balls, form the shaft thread into a nonself-locking rolling thread, so that with this embodiment, a controllable arresting means must be provided. The nut 12, with the one-piece embodiment as illustrated, is connected to the tie rod 1, so that the axial movement of the nut 12 produced by the electric motor 4 at the same time results in an axial movement of the tie rod 1.

In the illustrated embodiment, the controllable arresting means comprises a pressure plate 14 that is disposed on a support plate 15 in such a way that it cannot rotate, yet can be displaced to a limited extent in the axial direction; the support plate 15, in turn, is fixedly connected to the housing 2. The pressure plate 14 is provided with radial teeth 14a that mesh with corresponding radial teeth 4f on the motor shaft 4d of the electric motor 4. In the normal situation, this meshing is effected by compression springs 16 that are distributed over the periphery and are disposed between the support plate 15 and the pressure plate 14. The meshing between the radial teeth 4f of the motor shaft 4d and the radial teeth 14a of the pressure plate 14 that is nonrotatably held on the support plate 15 assures that no unintentional rotation of the motor shaft 4d relative to the housing 2 occurs, even though no self-locking of the shaft drive is effected by the roller bodies 13.

As soon as planned adjustment is to be effected, the pressure plate 14 is shifted to the left, against the force of the compression springs 16, by a magnet coil or winding 17 (FIG. 1) until the radial teeth 4f and 14a no longer engage one another. In the illustrated embodiment, this is achieved by a repelling effect of the magnet winding 17 that is disposed in the motor cover 4c.

After the above-described controllable arresting means is set free, the electric motor 4 is turned on for axial adjustment of the tie rod 1. In so doing, the rotor 4e carries out a rotary movement relative to the stator 4b. This rotary movement results in a rotation of the pinion 8 relative to the housing 2. If in this connection the non-illustrated arbor with the tie rod 1, and along therewith the housing 2, are to rotate, the relative rotational movement of the rotor 4e relative to the stator 4b that is drawn upon for adjustment of the tie rod 1 must be added to the rotational movement that the rotor 4e already carries out relative to the stationary stator 4b due to the rotation of the arbor.

The differential speed brought about by a rotation of the shaft 9 leads via the roller bodies 13 to an axial displacement of the nut 12 relative to the shaft 9. In this way, the nut 12, which is disposed in a support flange 1a that is connected to the tie rod 1, leads to an axial displacement of the tie rod 1.

Due to the clamping force that is exerted by the tie rod 1 onto a not-illustrated chuck, one of the two spring-loaded elements 11 is stressed, depending upon the clamping direction. In conformity with the spring characteristic of the spring-loaded element 11, a slight axial displacement of the bearing housing 10 relative to the housing 2 or the housing cover 2a results, whereby the force stored in the spring-loaded element 11 produces an appropriate post-clamping effect for the chuck. The axial displacement of the shaft 9 relative to the housing 2 can be detected by a suitable sensor for determining the force that is stored in one of the spring-loaded elements 11.

The second embodiment illustrated in FIG. 3 differs from the first embodiment in that when the arbor, i.e. the tie rod 1, rotates, the stator 4b of the electric motor 4 also rotates. For this reason, the stator 4b is not disposed in a separate motor housing 4a, but rather in an appropriate extension 2b of the housing 2, with the end of the extension 2b being closed off by the motor cover 4c. In order to be able to supply the energy that is supplied to the electric motor 4 via the lead 6 to the rotating stator 4b, a support 18 having slip rings 18a is provided. The support 18 is mounted on the motor shaft 4d via ball bearings 19, and remains stationary when the apparatus rotates. The spring-loaded slip ring shoes 20 that are disposed in the motor cover 4c, the energy is withdrawn from the slip rings 18a and is supplied to the stator 4b.

In the second embodiment, the thread between the shaft 9 and the nut 12 is embodied as a self-locking slip thread, so that in this case a controllable arresting means can be eliminated.

The present invention is, of course, in no way restricted to the specific disclosure of the specification and drawings, but also encompasses any modifications within the scope of the appended claims.

What I claim is:

1. In an electromechanical apparatus for producing an axial force for the actuation of a clamping device, the apparatus including an electric motor that has a stator and a rotor, with the relative movement between the rotor and stator being transferable, via a gear system and a shaft drive, as an axial movement, to a tie rod, the improvement comprising:
   a housing;
   a gear wheel connected with said rotor;
   at least one shaft, with each shaft being mounted in said housing in such a way that it essentially cannot shift axially;
   secured to each shaft, a respective pinion, each of which meshes with said gear wheel; and
   disposed on each shaft, a respective nut that in turn is connected to said tie rod, which is axially movably mounted in said housing.

2. An apparatus according to claim 1, in which each shaft and nut has threads with thread sides; in which roller bodies are disposed between the sides of the threads of each shaft and each nut; and in which an arresting means is operatively disposed between said shaft and said housing.

3. An apparatus according to claim 2, which includes spring means in said housing for urging said arresting means into an arresting position, and also includes an electromagnet for disengaging said arresting means counter to the force of said spring means.

4. An apparatus according to claim 1, which includes spring-loaded means disposed between each shaft and said housing, with said shaft and its pinion being displaceable relative to said housing and said gear wheel by a prescribed travel stroke of said spring-loaded means.

5. An apparatus according to claim 4, which includes sensor means for detecting said shifting of said shaft to determine the stored force.

6. An apparatus according to claim 1, in which said stator of said electric motor is disposed in a housing portion that is connected to said housing for said shaft and rotates therewith, with a slip ring arrangement being provided for the supply of electrical energy to said stator.

* * * * *